(12) United States Patent
Bleus et al.

(10) Patent No.: US 8,229,266 B2
(45) Date of Patent: Jul. 24, 2012

(54) OPTICAL SIGNAL DISTRIBUTION ASSEMBLY WITH OPTICAL CONNECTOR HOLDER

(75) Inventors: Heidi Bleus, Genk (BE); Peter Bos, Schoonderbuken (BE); Luc Devooght, Meensel-Kiezegem (BE); Eric Schurmans, Hogen-Geetbets (BE)

(73) Assignee: Tyco Electronics Raychem NV, Kessel-Lo (BE)

( * ) Notice: Subject to any disclaimer, the term of this patent is extended or adjusted under 35 U.S.C. 154(b) by 0 days.

(21) Appl. No.: 12/834,770

(22) Filed: Jul. 12, 2010

(65) Prior Publication Data

US 2011/0311184 A1 Dec. 22, 2011

Related U.S. Application Data (62) Division of application No. 11/665,796, filed as application No. PCT/GB2005/003971 on Oct. 14, 2005, now Pat. No. 7,756,381.

(30) Foreign Application Priority Data

Oct. 26, 2004 (GB) .................................. 0423743.4

(51) Int. Cl.
*G02B 6/00* (2006.01)
(52) U.S. Cl. ........................................ 385/135; 385/134
(58) Field of Classification Search .................... 385/135
See application file for complete search history.

(56) References Cited

U.S. PATENT DOCUMENTS

| | | | |
|---|---|---|---|
| 5,268,982 A | 12/1993 | Schaffer et al. | |
| 5,317,662 A | 5/1994 | Hotea | |
| 5,748,821 A | 5/1998 | Schempp et al. | |
| 5,838,858 A | 11/1998 | White | |
| 6,058,235 A * | 5/2000 | Hiramatsu et al. | 385/135 |
| 6,081,642 A | 6/2000 | Asada | |
| 6,132,104 A * | 10/2000 | Bliss et al. | 385/53 |
| 6,167,183 A | 12/2000 | Swain et al. | |
| 6,272,276 B1 * | 8/2001 | Potteiger et al. | 385/135 |
| 6,305,848 B1 * | 10/2001 | Gregory | 385/53 |
| 6,344,911 B1 * | 2/2002 | Dailey et al. | 398/82 |
| 6,425,691 B1 | 7/2002 | Demangone | |
| 6,517,253 B1 | 2/2003 | Graesser | |
| 6,592,266 B1 | 7/2003 | Hankins et al. | |
| 6,623,177 B1 * | 9/2003 | Chilton | 385/88 |

(Continued)

FOREIGN PATENT DOCUMENTS

EP  0 828 356 A  3/1998

(Continued)

OTHER PUBLICATIONS

International Search Report for PCT/GB2005/003971 issued by the European Patent Office on Nov. 24, 2005.

*Primary Examiner* — Ryan Lepisto
(74) *Attorney, Agent, or Firm* — Faegre Baker Daniels LLP (57) ABSTRACT

A connector holder suitable for use in a communications signal distribution system, comprising first and second parts between which an optical connector element may be secured, and which have means for locating the holder in one of a number of different positions and/or orientations on a base or other support of an optical fibre termination unit, whereby to permit a selected one of a number of different connector elements to be held between the two parts of the connector holder, and means for holding the two parts together with a connector element between them.

32 Claims, 8 Drawing Sheets

U.S. PATENT DOCUMENTS 6,661,961 B1 12/2003 Allen et al.
6,762,941 B2 * 7/2004 Roth .............................. 361/736
6,847,775 B2 * 1/2005 Maruyama et al. ........... 385/135
6,920,275 B2 7/2005 Chamorro et al.
7,062,132 B2 * 6/2006 Basavanhally et al. ......... 385/52

2003/0031452 A1 2/2003 Simmons et al.

FOREIGN PATENT DOCUMENTS

WO  WO 01/50170 A  7/2001

* cited by examiner

OPTICAL SIGNAL DISTRIBUTION ASSEMBLY WITH OPTICAL CONNECTOR HOLDER

CROSS-REFERENCE TO RELATED APPLICATION

This application is a Divisional Application of patent application Ser. No. 11/665,796 filed Feb. 11, 2008 now U.S. Pat. No. 7,756,381, which is a §371 national phase of International Application No. PCT/GB2005/003971 filed Oct. 14, 2005 claiming the benefit of Great Britain Application No. 0423743.4, filed Oct. 26, 2004, the complete disclosures of which are hereby expressly incorporated by reference.

BACKGROUND OF THE APPLICATION

The present invention relates to a signal distribution assembly, and particularly (although not exclusively) to an interface assembly suitable for domestic applications, and to a connector for use therewith.

The increasing use of optical fibres for the transmission of signal information in urban environments, it is becoming more common to deliver information signals to households on optical fibres. Thus, instead of copper wire cables connected to domestic establishments it is now possible to bring optical fibres directly into the home. This makes broadband signals available economically and allows a wide range of different information to be transmitted simultaneously on a single line. At the termination within the domestic establishment a number of different connectors are required for the different signal-utilising electrical equipment items which may be in use in the home. For example, the incoming signals on a single optical fibre may be delivered to a telephone, a computer, a facsimile machine, a television or other electrical signal-utilising equipment. Each of these items, hereinafter referred to generically as consumer units, requires a separate electrical signal line input, and in order to separate the multiplicity of signals carried on the optical fibre it is necessary to install an electronic interface unit having a transducer for converting the optical signals into electrical signals, and an electronic circuit for separating out the individual signals intended for different consumer units and delivering them to appropriate sockets to receive connector elements electrically connected to the individual consumer units by electrically conductive wire.

The formation of an optical coupling at the termination of an optical fibre requires accurate positioning of the elements in order to ensure that the optical coupling functions correctly. For this reason it has conventionally been necessary, once an optical fibre has been brought into a domestic environment, for the cable installer to leave in place a fibre termination unit which comprises an optical splice and a so-called "pigtail" which comprises an excess length of optical fibre wound in a casing and running between the incoming optical fibre, to which it is connected by a suitable splice. The need for the excess length of optical fibre results from the fact that splicing of optical fibres to change connections usually involves cutting the fibre and, therefore shortening its length. The excess length is necessary in order to ensure that any future changes to the configuration of the installation can take place bearing in mind that optical fibre has a minimum bend radius beyond which the fibre must not be bent since this would result in a degradation of the transmitted signal, thereby losing the benefits of utilising optical fibres in the first place.

According to one aspect of the present invention an alternative configuration is provided in which the fibre termination unit installed by the cable supplier can be fitted with an optical fibre connector held in a universal connector holder which is adapted to be able to receive any one of a wide range of known commercially available connector elements. The particular connector element in use in any area is determined inter alia by the Local Authority or commercial considerations, and because a wide range of electrical connectors is available on the market it is known that different connector elements will be utilised in different areas. A national company acquiring fibre termination units from a single source will, however, wish to be able to install those units anywhere in the country regardless of the particular choice made by the Local Authority of individual optical connector elements to be utilised in their area. The present invention seeks to provide means by which this can be achieved.

In another aspect of the present invention there are provided means by which an electronic interface unit of standardised dimensions can be fitted directly by a user with a single, simple plug-in action without requiring any specialist skill to make the optical connection between the connector element terminating the optical fibre pigtail in the fibre termination unit with a connector linking to a transducer for converting the optical signals into electrical signals. The present invention thus comprehends a signal distribution assembly comprising a fibre interface unit having a connector element in a fixed location capable of receiving an electronic interface unit located by suitable guide means to adopt an accurate relative position and orientation with respect to the fibre termination unit without requiring specialist operatives to make the optical connection between the two units.

At the heart of this system is a universal optical fibre connector holder suitable for use in a fibre optic communications signal distribution system comprising first and second parts between which an optical connector element may be secured, and which have means for locating one part of the holder in one of a plurality of different positions and/or orientations on a base of an optical fibre termination unit whereby to permit a selected one of a number of different connector elements to be held between the two parts of the connector holder and means for holding the two parts together with a connector element between them.

As used in this specification the term "base" will be understood to refer to any form of support for the components of a fibre termination unit, and to include within its scope a flat panel or tray which may be open, or an enclosed casing or housing (in which case the "base"may be one wall of the casing or housing).

A connector holder as defined hereinabove may be orientable into different orientations to hold different connectors in the same predetermined position, the connectors being selectable from at least MT-RJ, SC, SC duplex, LC MU and Lcµ types, and possibly also other commercially available connector elements.

The present invention also comprehends a fibre termination unit comprising a base (as herein defined) having a port for receiving an incoming optical fibre, means for storing an excess length of optical fibre, and an optical fibre connector located at the free end of the optical fibre for making an optical connection with a complementing cooperating connector of an interface unit having a transducer for converting the optical signals carried by the optical fibre into electrical signals, the said optical fibre connector being retained in a holder having means by which it can be secured to a base or casing of the fibre termination unit in a selected position and/or orientation whereby to locate a selected said connector in a predetermined position and/or orientation for connection to an interface unit having a complementary cooperating connector.

A fibre termination unit formed as an embodiment of the present invention may have one of the base and the connector holder provided with a plurality of projections, the other having a plurality of openings, the said projections and openings being so positioned that the connector holder can engaged onto the base in one of a plurality of different predetermined positions and/or orientations.

Thus, the base of the fibre termination unit may be provided with means for receiving and locating any one of a number of different holders, each adapted to hold a specific connector, or may receive a single type of holder in different positions and/or orientations, the single holder being adapted to receive a range of different connectors.

In a preferred embodiment of the invention the base of the fibre termination unit carries or is formed with guide means by which an electronic interface unit can be located and guided into position with the optical connector element making connection with the optical connector element on the fibre termination unit.

The said guide means of the fibre termination unit may comprise elongate guide members installable or pre-installed to project from the unit in a direction parallel to the direction of relative approach of the connector elements when they are introduced into a coupling or connection relationship. The guide members (preferably pins) may conveniently be provided together with the electronic interface unit for installation by the customer in appropriate formations (preferably apertures) of either one of the respective units prior to bringing the units together.

The base of the fibre termination unit may be provided with snap-engagement elements for engagement with cooperating elements of an electronic interface unit whereby to hold the two said units together. This physical interconnection of the two units preferably also relieves the pressure on the connector elements, holding them in position by means additional to any snap-engagement means by which the connector elements are secured together.

In a fibre termination unit formed as a preferred embodiment of the invention the connector elements have snap-engagement components to retain them together in coupled relationship, and the connector holder is so positioned that upon connection of the interface unit with the fibre termination unit the snap-engagement of the connector elements occurs before the snap-engagement of the casings or housings of the interface unit and the fibre termination unit.

The present invention also comprehends a signal distribution assembly of a communication system comprising a fibre termination unit and an electronic interface unit, in which the fibre termination unit and the electronic interface unit each have cooperating optical fibre connector elements, and casing guide and location elements allowing an electronic interface unit to be connected to a previously-installed fibre termination unit in a single connection operation, the guide elements being such as to locate and align the connector elements in an orientation such as to make on optical connection between the optical connector elements upon fitting together the said two units guided by the guide elements, the assembly preferably further comprising any of the features hereinbefore described. Preferred among such further features are:— either the said optical fibre connector element of the fibre termination unit is retained in a holder having means by which it can be secured to a base or casing of the fibre termination unit in a selected position and/or orientation whereby to locate a selected said connector, selected from a group comprising two or more different connectors, in a predetermined position and/or orientation for connection to the said interface unit;

or the said guide elements comprise elongate members (preferably pins) installable or pre-installed to project from either one of the said units in a direction parallel to the direction of approach of the connector elements when being introduced into coupling connection relationship;

or the said units are provided with snap-engagement elements for engagement with cooperating elements of each other to hold the two said units together, and the connector elements have snap-engagement elements to retain them together in coupled relationship and are so positioned that upon connection of the interface unit with the fibre termination unit the snap-engagement of the connector elements occurs before the snap-engagement of the fibre termination unit and the interface unit.

A signal distribution assembly formed as an embodiment of the invention may further be provided with electrical connectors in the interface unit to form electrical connections with different electrical signal consumer units such as telephone, facsimile machine, television, computer and the like, typically RJ45 connectors may be used. In some preferred embodiments of the assembly or fibre termination unit according to the present invention, the fibre termination unit incorporates a television receiver, for example a CATV receiver, and connection means for connecting the receiver to a television display unit. In such embodiments, the fibre termination unit may have a service/customer demarcation cover with an aperture providing access to connection means for connecting television signal and power cables to the receiver.

Various embodiments of the present invention will now be more particularly described, by way of example, with reference to the accompanying drawings, in which:

FIG. 7 illustrates the universal optical fibre connector holder in exploded view showing the two parts in a first orientation (FIG. 7*a*) and a second orientation (FIG. 7*b*)

Figure 1:
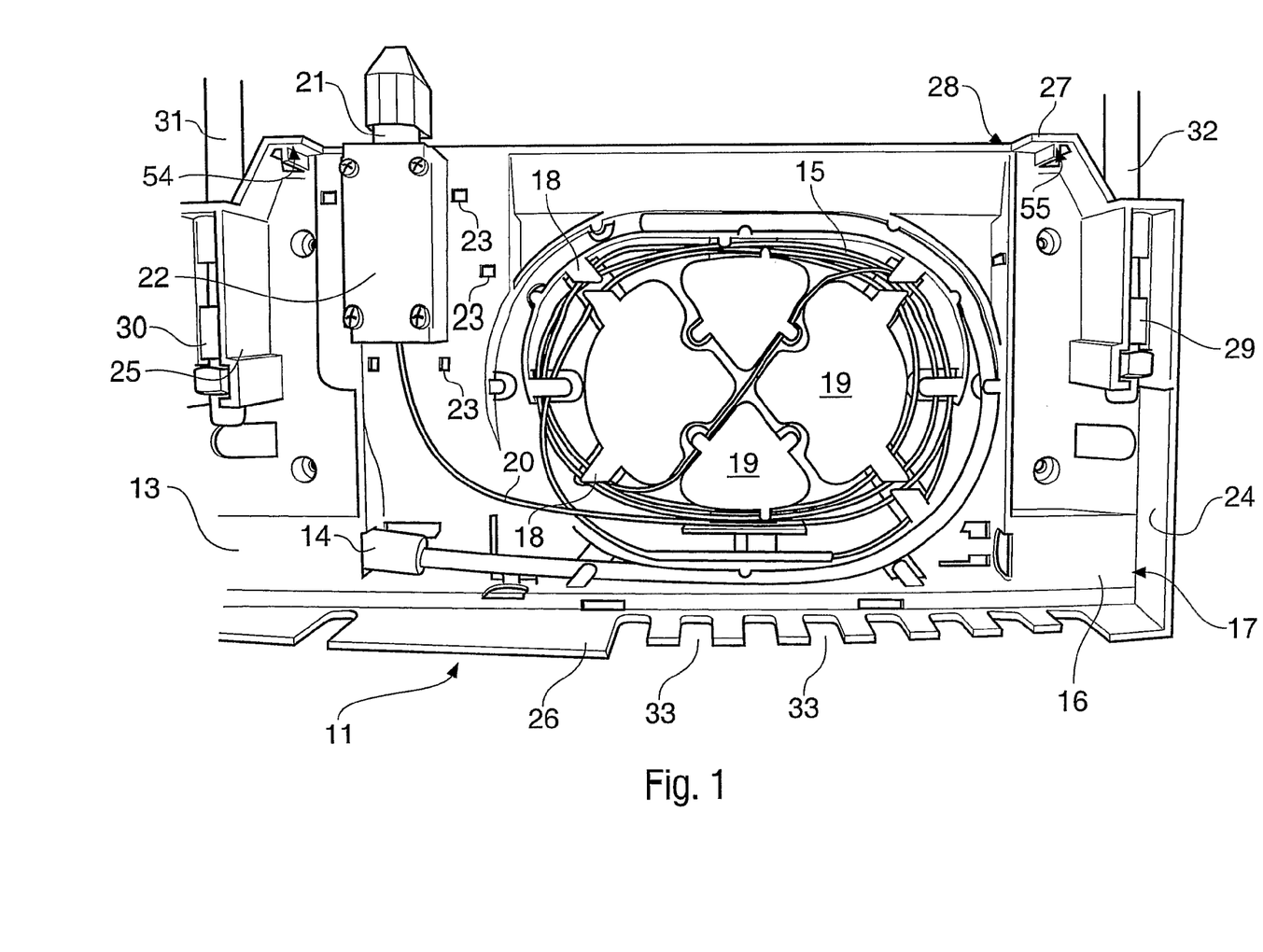
FIG. 1 is a plan view from above of a fibre termination unit forming part of the signal distribution assembly of the present invention.

Referring now to the drawings, and particularly to FIG. 1 thereof, the signal distribution assembly of the present invention comprises a fibre termination unit generally indicated 11 (FIG. 1) and an interface unit generally indicated 12 (FIG. 2) intended to be interconnected to the fibre termination unit to form a composite signal distribution assembly.

In use it is anticipated that the fibre termination unit will be installed in a building by the cable installer having brought an optical fibre 13 into the building, this optical fibre being spliced at a splice 14 to a pigtail 15 an overlength of which is stored in a plurality of coils on a base 16 of a casing 17 of the fibre termination unit. The base 16 has a plurality of spaced projections 18 and guides 19 in a shallow depression which forms a suitable housing for the overlength of pigtail allowing this to be retained safely and securely with the curvature of the optical fibres greater than the minimum bend radius. A free end 20 of the pigtail is connected to a connector element 21 of an optical fibre connector which is held in a universal optical fibre connector holder 22. The universal fibre connector holder 22 will be described in more detail below. The base 16 of the lower part of the casing 17 has a plurality of holes 23 in positions spaced to receive the connector holder 22 in one of a number of positions or orientations which will be described in more detail below. The casing 17 of the interface unit 11 is in the form of a shallow tray having upstanding side walls 24, 25 and end walls 26, 27 the latter of which has a large shallow U-shape cut-out portion 28.

Extending parallel to the side walls 24, 25 of the casing 17 and secured in respective housings 29, 30 therein are two parallel metal guide pins 31, 32 the function of which will be explained in more detail below. These pins are threaded at their ends to allow them to be fitted by the end user to prepare the fibre termination unit to receive an interface unit. The pins are fitted by inserting them into openings in the casing of the fibre termination unit and threadedly engaging them on captive nuts provided for the purpose. Opposite the shallow cut-out portion 28 in the end wall 26 of the tray 17 are a plurality of generally U-shape notches or openings 33 the purpose of which will be described in more detail below.

Figure 2:
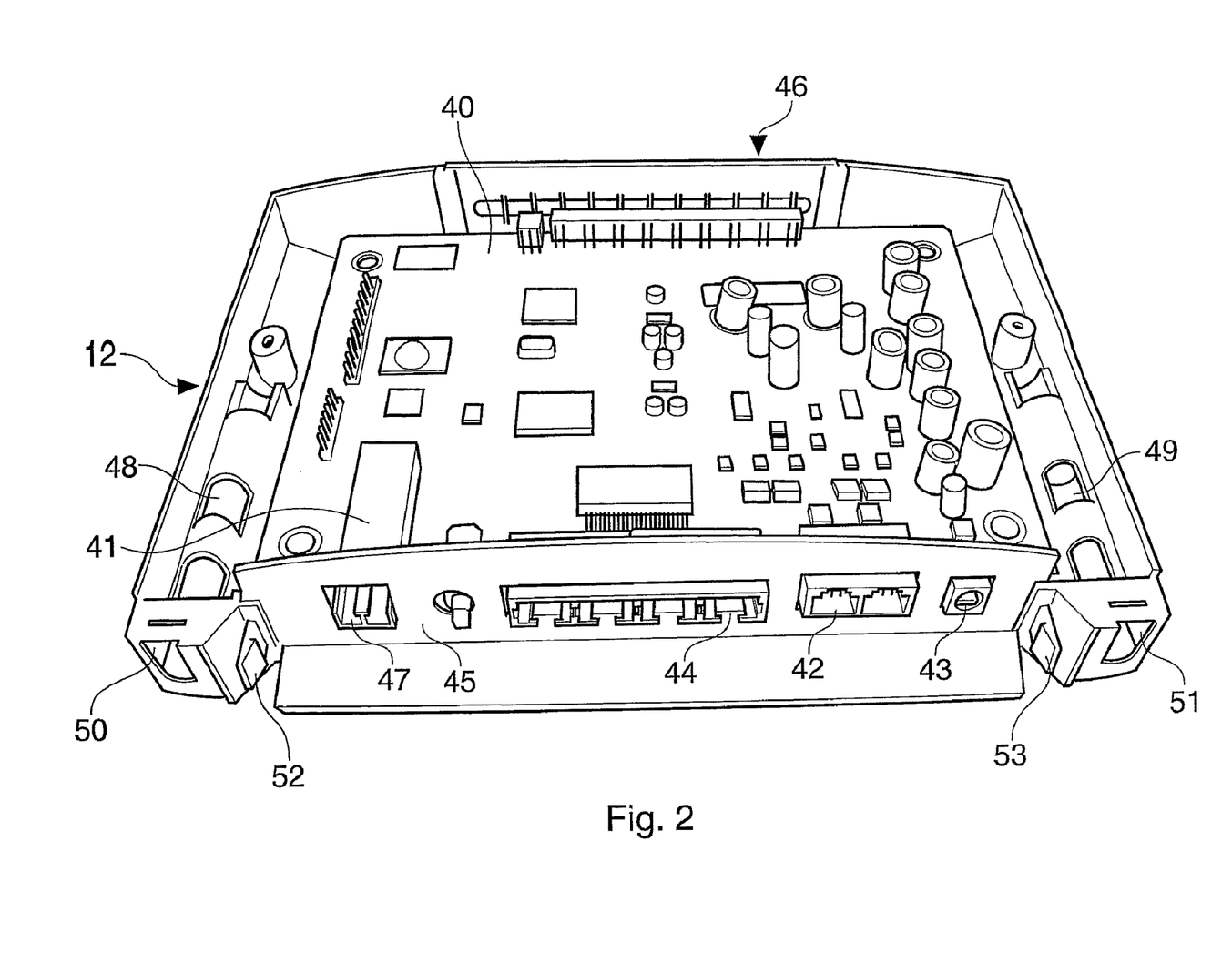
FIG. 2 is a perspective view from above of an interface unit suitable for use with the present invention to form a combined signal distribution assembly.

Referring now to FIG. 2, the interface unit 12 comprises a printed circuit board 40 of electronic components which are known per se and will not, therefore, be described in further detail herein except to say the board 40 carries an optical connector element 41 complementary to the optical connector element 21 of the fibre termination unit, and intended for connection therewith, this connector incorporating a transducer for converting the optical signals to electrical signals which are then filtered and processed by the electronic circuitry to provide individual output signals on a range of different sockets 42, 43, 44 in an end face 45 of a casing generally indicated 46 of the interface unit housing the printed circuit board 40. This end wall 45 also has an opening 47 through which the connector element 21 of the fibre termination unit can project in forming the connection with the connector element 41.

On each side the casing 46 has two generally cylindrical guide channels 48, 49 for receiving the guide pins 31, 32 of the fibre termination unit 11 when the interface unit 12 and the fibre termination unit 11 are fitted together.

In practice, because the fibre termination unit will be installed in a fixed position by the cable supplier it is anticipated that the interface unit 12 will be fitted to the fibre termination unit 11 by inserting the guide pins 31, 32 of the interface unit 11 through openings 50, 51 in the end wall 45 of the casing 46 of the interface unit 12 leading to the cylindrical channels 48, 49 the interior surface and/or structure of which is such as to engage these guide pins 31, 32 firmly without any play, but not so firmly as to prevent the two components being brought together manually. If the assembly is horizontally orientated the guide pins may support as well as locate the interface unit.

The end wall 45 of the interface unit 12 has two resilient projecting teeth 52, 53 which engage through openings 54, 55 in the end wall 27 of the tray 17 constituting the base part of the fibre termination unit 11. When the two units are pushed together firmly the resilient teeth 52, 53 snap-engage into the openings 54, 55 to hold the two units firmly together. By suitably positioning the holes 23 which determine the location of the connector holder 22 it is possible to ensure that any snap-engaging cooperating parts of the two connector elements 21, 41 snap-engage together just before the snap-engagement of the teeth 52, 53 in the holes 54, 55 so that, as the two parts are fitted together, the user can hear a first sharp click to confirm that the optical connection has been made and then a second click as the two components are fitted together.

Figure 3:
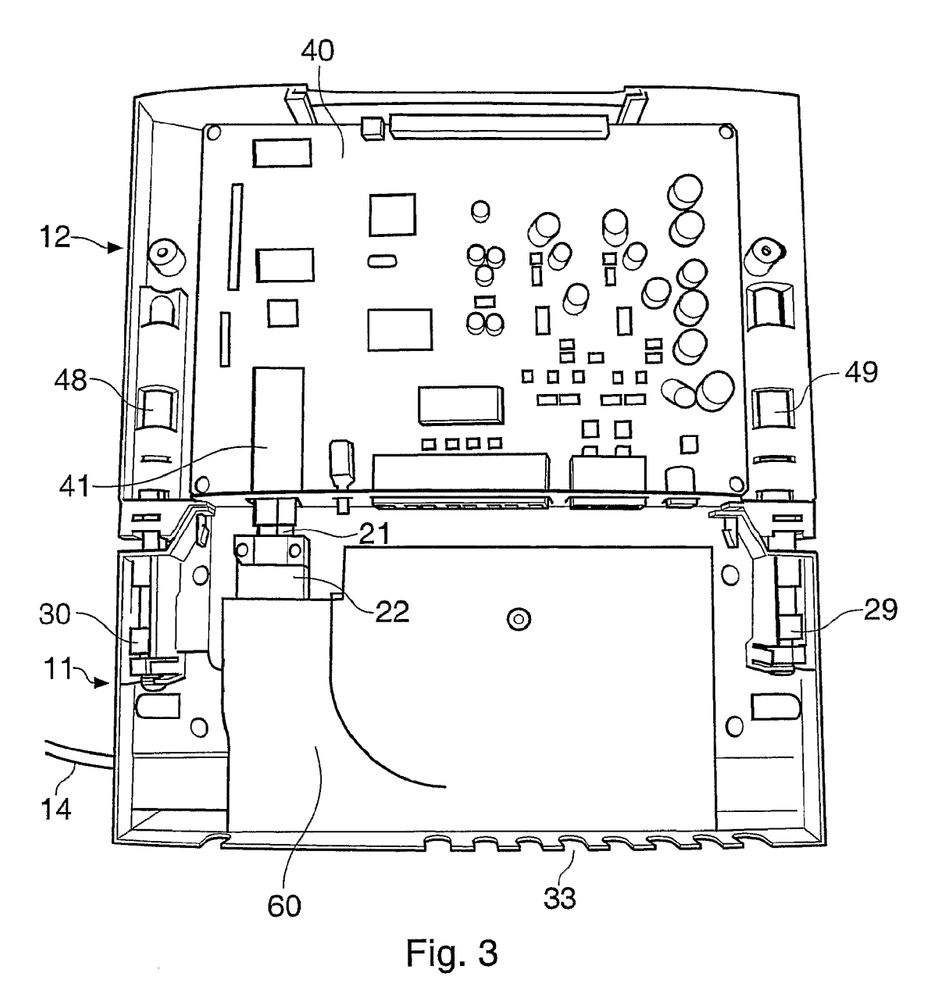
FIG. 3 is a plan view from above of the two units of FIGS. 1 and 2 shown interconnected to form a signal distribution assembly, shown with their covers removed to expose the internal components.

As can be seen in FIG. 3, which shows the fibre termination unit 11 securely connected to an interface unit 12, an intermediate cover 60 is provided over the pigtail overlength storage cavity in the tray 17 to protect the spare length of pigtail 15 from abrasion by wires which can then be led through the openings 33 in the end wall 26 of the fibre termination unit 11, across the tray 60 to be plugged into the connectors 42, 43 or 44 as appropriate, depending on the nature of the electrical consumer unit to which the wires are connected.

Figure 4:
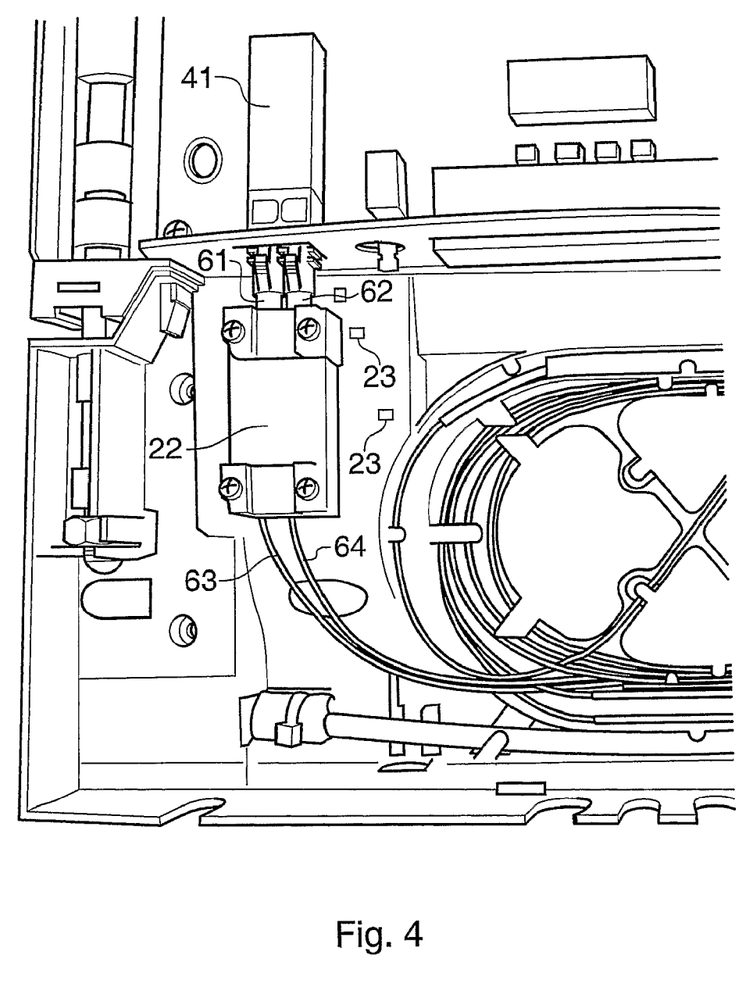
FIG. 4 is an enlarged view of the fibre termination unit illustrating a different form of optical connector, and illustrating the universal optical connector holder in a different position.

FIG. 4 illustrates a fibre termination unit similar to that of FIG. 1, but in which the universal connector holder 22 is fitted into a different set of the openings 23 and carries a different optical connector arrangement. In fact, it carries two optical connectors 61, 62 to which two pigtails 63, 64 are spliced, and which connect into cooperating connector elements (not shown) within the connector 41 of the interface unit.

Figure 5:
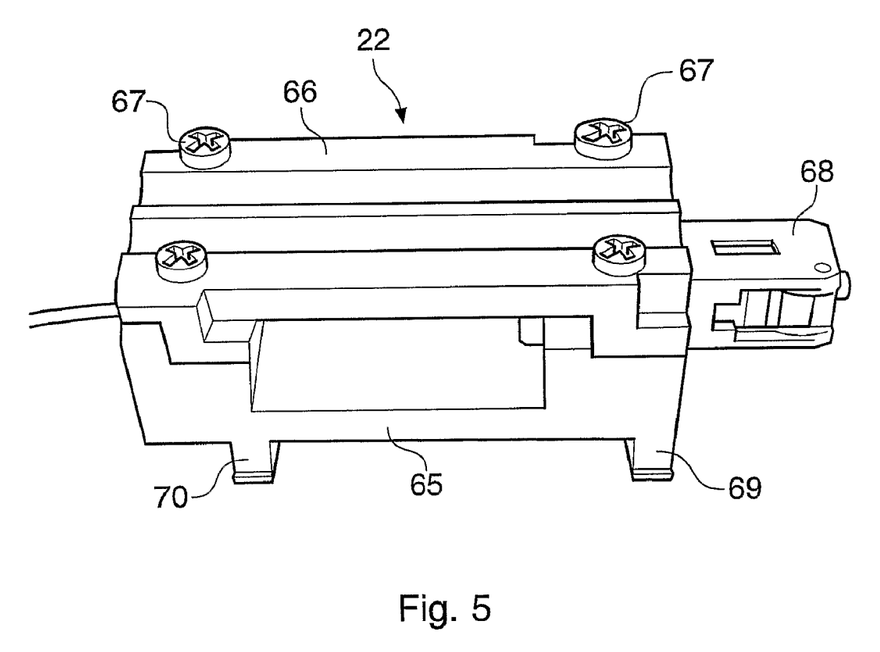
FIG. 5 illustrates a perspective view of the universal optical connector holder showing a first optical connector in one configuration thereof.
Figure 6:
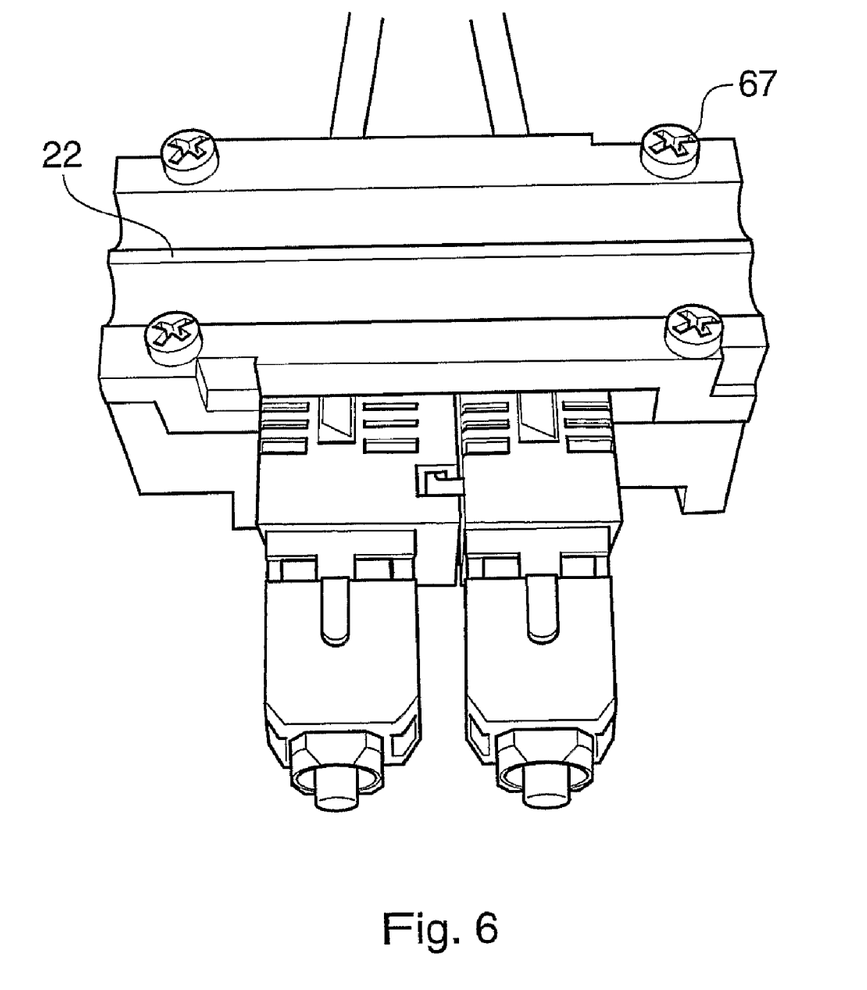
FIG. 6 is a perspective view of the universal optical connector holder of FIG. 5 illustrating it in a different configuration utilising a different type of optical connector in which two optical fibre connectors are mounted in the holder.
Figure 7A:
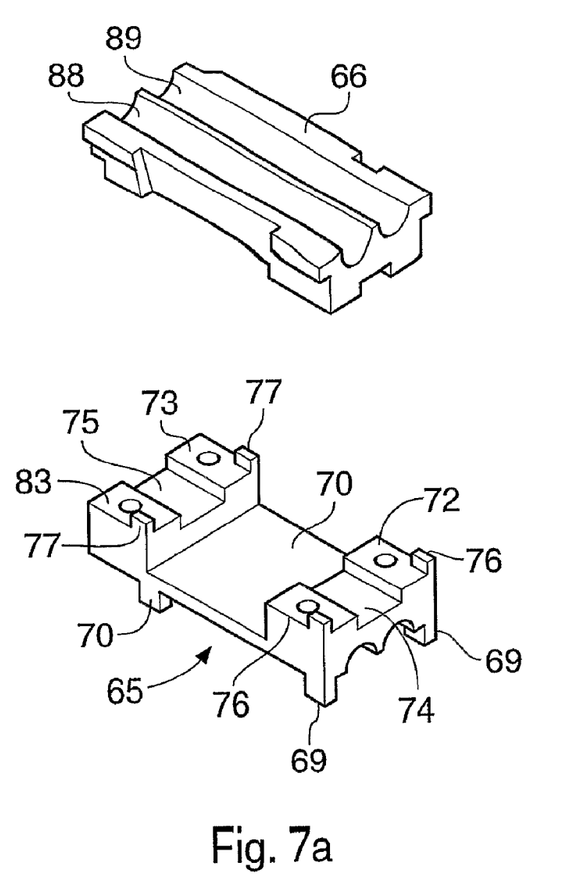
Figure 7B:
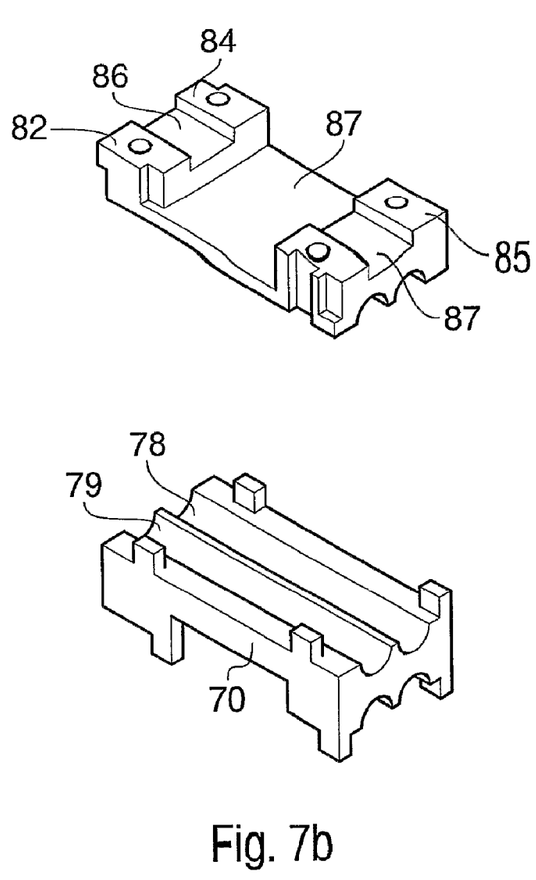

FIGS. 5 to 7 illustrate the form of the connector holder 22. This comprises a first part 65 shaped to fit together with a second part 66. In the embodiment illustrated the two parts 65, 66 are held together by screws 67 although other fixing means, such as bolts, snap-engagement parts or the like may be used. The two connector holder parts 65, 66 clamp between them a connector element 68. The lower part 65 of the connector holder has four legs in pairs, one pair 69 at the right hand end as viewed in FIG. 5, and the second pair 70 somewhat spaced from the left hand end as viewed in FIG. 5. The two components 65, 66 of the optical connector holder 22 have, as can be seen in FIGS. 7a and 7b a complementary shape which allows them to be fitted together in a number of different ways to form suitably shaped cavities for receiving different connectors such as the MT-RJ, the SC, SC duplex, LC or LCμ type of connector.

As can be seen in FIG. 7a the lower connector holder part 65 comprises a plate-like main base 80 downwardly from which project the previously mentioned legs 69 and 70. Upwardly from the base 80, at each end thereof, are two upstanding blocks 72, 73 each having a channel-shape recess 74, 75 therein. Upwardly from the blocks 72, 73 project two pairs of legs 76 and 77 which are aligned with but face in opposite directions from the legs 69, 70 which project downwardly from the base plate 80. Although shown as straight legs in FIGS. 7a and 7b, the legs 69, 70, and the legs 76, 77 may have laterally projecting teeth at their free ends for snap-engagement in the holes 23 of the base of the fibre termination unit. As can be seen in FIG. 7b, which shows the plate 80 inverted, the opposite face thereof bears two longitudinal channels 78, 79 extending the full length of the plate 80. The upper part 66 of the connector holder 22 is a generally plate-shape body 81 having four holes 82, one in each corner thereof, which when the two parts 66, 65 are fitted together, align with cooperating holes 83 in the bottom part 65 to receive the screws 67. As can be seen in FIG. 7*a* on one face of the plate-like body 81 of the upper part 66 of the connector holder 22 there are two longitudinal channels 88, 89 corresponding in form to the channels 78, 79 in the bottom part 65, and as can be seen in FIG. 7*b* on the other face of the plate 81 there are respective upstanding blocks 84, 85 having shallow channels 86, 87 therein matching the channels 74, 75 in the blocks 72, 73 of the bottom part.

This configuration then allows the two parts to be fitted together in a number of different relative configurations the first of which is shown in FIG. 5 in which the two flat faces of the plate-like bodies 80, 81 face one another to form an interior cavity with two aligned channels defined by the two cavities 75, 86 at one end and 74, 87 at the other. The connector 68 is thus retained in the cavity defined by the two channels 74, 87.

Without changing the relative orientation of the upper and lower part of the connector holder 22, however, it is also possible to fit two connector elements within the laterally transverse channel defined between the two parts as shown in FIG. 6. Other configurations can be formed by inverting both the upper and lower parts so that the longitudinal channels 78, 79 in the lower part and 88, 89 in the upper part face one another to form suitable longitudinal channels for receiving a different shape of connector element.

Figure 8:
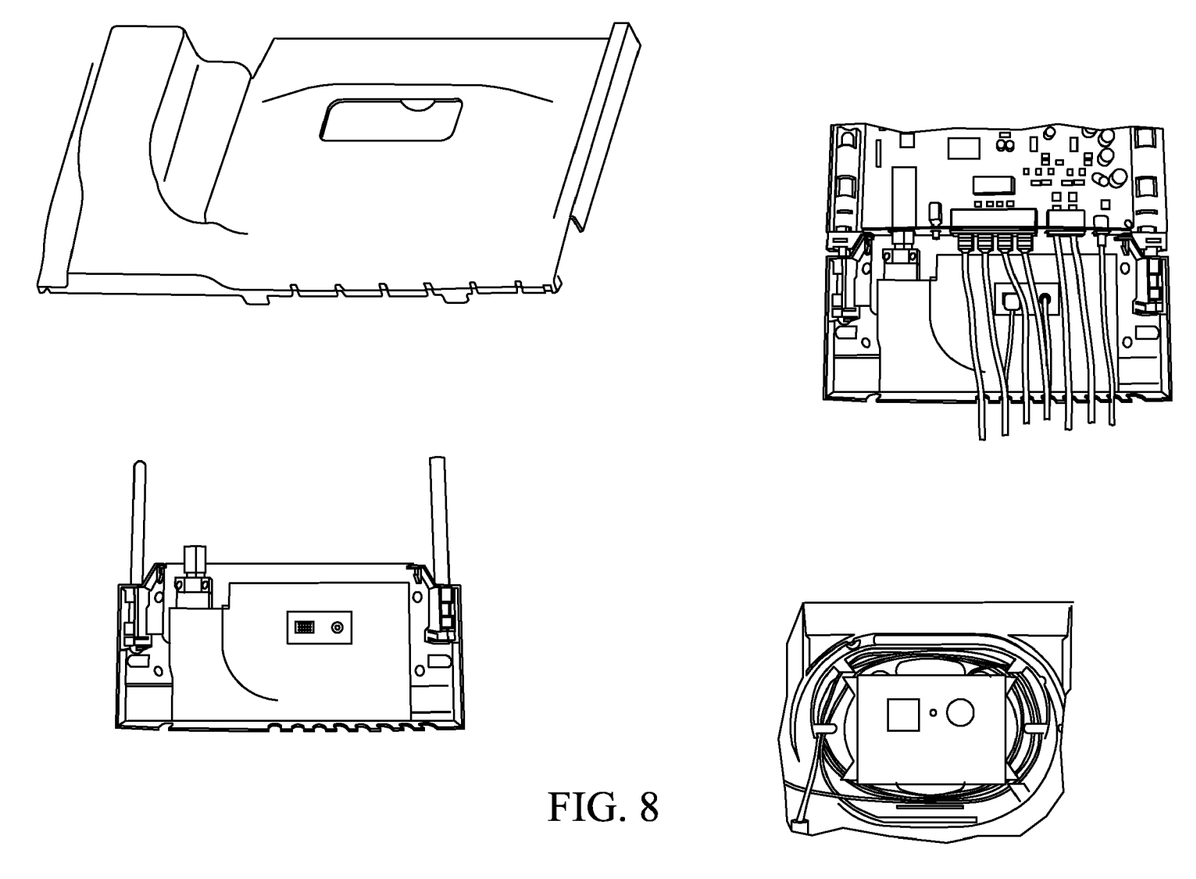
FIG. 8 shows a fibre termination unit according to the present invention carrying a CATV receiver having power and signal cable connection points, with a service/customer demarcation cover of generally known kind modified by a cut-out aperture providing access for power and signal (preferably coaxial) cables to be connected to the receiver, as shown.

FIG. 8 shows an example of a fibre termination unit according to the present invention carrying a CATV receiver having power and signal cable connection points, with a service/customer demarcation cover modified by a cut-out aperture providing access for power and signal (preferably coaxial) cables to be connected to the receiver.

The invention claimed is:

1. A signal distribution assembly for a communications system comprising a fibre termination unit installed at a user's premises and an electronic interface unit having a casing, the fibre termination unit and the electronic interface unit each having cooperating optical fibre connector elements, and one of the fibre termination unit and the interface unit having a casing guide and the other of the fibre termination unit and the interface unit having guide elements, the casing guide and the guide elements allowing the electronic interface unit as a whole to be fitted to the fibre termination unit in a single plug-in connection action, the guide elements cooperating with the casing guide to locate and align the connector elements in an orientation configured to make an optical connection between the optical connector elements of the units when the units are guided by the guide elements and are connected together, wherein the units are provided with snap-engagement elements for engagement with each other to hold the units together, and the connector elements each have snap-engagement elements to retain them together in a coupled relationship and are so positioned that upon connection of the interface unit as a whole with the fibre termination unit the snap-engagement of the connector elements occurs before the snap-engagement of the fibre termination unit and the interface unit, thereby ensuring secure optical connection between the units, wherein the fibre termination unit incorporates a television receiver and connection means for connecting the receiver to a television display unit.

2. The signal distribution assembly as claimed in claim 1, wherein the electrical connectors of the interface unit form electrical connections with different electrical signal consumer units selected from the group consisting of a telephone, a facsimile machine, a television, a computer and the like.

3. The signal distribution assembly according to claim 1, wherein the fibre termination unit has a service/customer demarcation cover with an aperture providing access to the connection means for connecting a television signal and power cables thereto.

4. A signal distribution assembly for a communications system comprising a fibre termination unit installed at a user's premises and an electronic interface unit having a casing, the fibre termination unit and the electronic interface unit each having cooperating optical fibre connector elements, and one of the fibre termination unit and the interface unit having a casing guide and the other of the fibre termination unit and the interface unit having guide elements, the casing guide and the guide elements allowing the electronic interface unit as a whole to be fitted to the fibre termination unit in a single plug-in connection action, the guide elements cooperating with the casing guide to locate and align the connector elements in an orientation configured to make an optical connection between the optical connector elements of the units when the units are guided by the guide elements and are connected together, wherein the units are provided with snap-engagement elements for engagement with each other to hold the units together, and the connector elements each have snap-engagement elements to retain them together in a coupled relationship and are so positioned that upon connection of the interface unit as a whole with the fibre termination unit the snap-engagement of the connector elements occurs before the snap-engagement of the fibre termination unit and the interface unit, thereby ensuring secure optical connection between the units, including a connector holder suitable for use in a communications signal distribution system, comprising a first part and a second part between which at least one of the optical connector elements of the fibre termination unit and the interface unit are secured, and the connector elements of at least one of the fibre termination unit and the interface unit have means for locating the connector holder in one of a plurality of positions and/or orientations on a base of the optical fibre termination unit, and means for holding the first and second parts together with the optical connector element of at least one of the fibre termination unit and the interface unit positioned between the first and second parts.

5. The signal distribution assembly according to claim 4, wherein the connector holder is orientable into different orientations to hold different connectors in a predetermined position and/or orientation for cooperation with the complementary connector.

6. The signal distribution assembly according to claim 4, in which the connector element to be held in the connector holder is chosen from MT-RJ, SC, SC duplex, LC, MU and Lcµ types.

7. The signal distribution assembly according to claim 4, wherein the fibre termination unit includes the base, and the base has a port for receiving an incoming optical fibre, means for storing an excess length of the optical fibre, and one of the optical fibre connector elements at a free end of the optical fibre for making the optical connection with the complementary cooperating connector element of the interface unit, the interface unit having a transducer for converting a plurality of optical signals carried by the optical fibre into electrical signals, wherein the casing of the interface unit is provided with the snap-engagement elements for engagement with cooperating elements of the base of the fibre termination unit to hold the units together and the connector elements have snap-engagement elements to retain them together in a coupled relationship.

8. A fibre termination unit as claimed in claim 7, in which the base of the fibre termination unit carries or is formed with guide means by which the electronic interface unit can be located and guided into a position in which the optical connector element thereon connects with the optical connector element of the fibre termination unit.

9. The signal distribution assembly according to claim 8, in which the guide means comprise parallel elongate pins projecting from the base of the fibre termination unit in a direction parallel to the direction of approach of the connector elements when being introduced into the coupled relationship.

10. The signal distribution assembly according to claim 7, in which the connector holder has means for retaining a connector element selected from a group comprising six different connector types.

11. The signal distribution assembly according to claim 4, wherein at least one of the optical fibre connector elements is retained in the connector holder with means-for securing the connector holder to the base of the fibre termination unit in a selected position and/or orientation for connection to the complementary cooperating connector element of the interface unit.

12. The signal distribution assembly according to claim 4, in which the connector holder has means for retaining one of two or more different connectors selected from a group comprising two or more different connectors.

13. The signal distribution assembly according to claim 4, in which the connector holder has means for retaining at least one of the connector elements selected from a group comprising six different connector types.

14. The signal distribution assembly according to claim 4, in which one of the base of the fibre termination unit and the connector holder is provided with a plurality of projections, the other having a plurality of openings, the said projections and openings being so positioned that the connector holder can be located on the base in one of a plurality of different predetermined positions and/or orientations.

15. A signal distribution assembly for a communications system comprising a fibre termination unit installed at a user's premises and an electronic interface unit having a casing, the fibre termination unit and the electronic interface unit each having cooperating optical fibre connector elements, and one of the fibre termination unit and the electronic interface unit having a casing guide and the other of the fibre termination unit and the interface unit having guide elements, the casing guide and the guide elements allowing the electronic interface unit as a whole to be fitted to the fibre termination unit in a single plug-in connection action, the guide elements cooperating with the casing guide to locate and align the connector elements in an orientation configured to make an optical connection between the optical connector elements of the units when the units are guided by the guide elements and are connected together, wherein the units are provided with snap-engagement elements for engagement with each other to hold the units together, and the connector elements have snap-engagement elements to retain them together in a coupled relationship and are so positioned that upon connection of the interface unit as a whole with the fibre termination unit the snap-engagement of the connector elements occurs before the snap-engagement of the fibre termination unit and the interface unit, thereby ensuring secure optical connection between the units, and wherein a connector holder comprises a first part and a second part, and the optical connector elements of at least one of the fibre termination unit and the interface unit are secured between the first and second parts, and the optical connector elements of at least one of the fibre termination unit and the interface unit having means for locating the connector holder in one of a plurality of positions and/or orientations on a base of the optical fibre termination unit, and means for holding the first and second parts together with the optical connector element of at least one of the fibre termination unit and the interface unit positioned between the first and second parts.

16. The signal distribution assembly according to claim 15, wherein the connector holder is orientable into the plurality of orientations to hold one of the connector elements in a predetermined position and/or orientation for cooperation with the cooperating connector element.

17. The signal distribution assembly according to claim 15, in which the connector element to be held in the connector holder is chosen from MT-RJ, SC, SC duplex, LC, MU and Lcµ types.

18. The signal distribution assembly according to claim 15, wherein the base has a port for receiving an incoming optical fibre, and means for storing an excess length of the optical fibre, wherein the connector element of the fibre termination unit is coupled to a free end of the optical fibre for making the optical connection with the cooperating connector element of the interface unit, and wherein the interface unit includes a transducer for converting a plurality of optical signals carried by the optical fibre into electrical signals, wherein the casing of the interface unit is provided with the snap-engagement elements for engagement with the base of the fibre termination unit to hold the units together.

19. The signal distribution assembly according to claim 15, in which the connector holder has means for retaining one of two or more of the connector elements selected from a group comprising two or more different connectors.

20. The signal distribution assembly according to claim 15, in which the connector holder has means for retaining at least one of the connector elements selected from a group comprising six different connector types.

21. The signal distribution assembly according to claim 15, in which one of the base of the fibre termination unit and the connector holder is provided with a plurality of projections, the other having a plurality of openings, the projections and openings being so positioned that the connector holder can be located on the base in one of a plurality of different predetermined positions and/or orientations.

22. The signal distribution assembly according to claim 15, in which the guide elements comprise parallel elongate pins projecting from the base of the fibre termination unit in a direction parallel to the direction of approach of the connector elements when being introduced into the coupled relationship.

23. The signal distribution assembly according to claim 15, wherein the fibre termination unit incorporates a television receiver and connection means for connecting the receiver to a television display unit.

24. The signal distribution assembly according to claim 23, wherein the fibre termination unit has a service/customer demarcation cover with an aperture providing access to connection means for connecting a television signal and power cables thereto.

25. A signal distribution assembly for a communications system comprising a fibre termination unit installed at a user's premises and an electronic interface unit having a casing, the fibre termination unit and the electronic interface unit each having cooperating optical fibre connector elements, and one of the fibre termination unit and the interface unit having a casing guide and the other of the fibre termination unit and the interface unit having guide elements, the casing guide and the guide elements allowing the electronic interface unit as a whole to be fitted to the fibre termination unit in a single plug-in connection action, the guide elements cooperating with the casing guide to locate and align the connector elements in an orientation configured to make an optical connection between the optical connector elements of the units when the units are guided by the guide elements and are connected together, wherein the said units are provided with snap-engagement elements for engagement with each other to hold the units together, and the connector elements have snap-engagement elements to retain them together in a coupled relationship and are so positioned that upon connection of the interface unit as a whole with the fibre termination unit the snap-engagement of the connector elements occurs before the snap-engagement of the fibre termination unit and the interface unit, thereby ensuring secure optical connection between the units, and wherein the fibre termination unit includes a base having a port for receiving an incoming optical fibre and means for storing an excess length of the optical fibre, and the connector element of the fibre termination unit being positioned at a free end of the optical fibre for making an optical connection with the complementary cooperating connector element of the interface unit, and wherein the interface unit includes a transducer for converting a plurality of optical signals carried by the optical fibre into electrical signals.

26. The signal distribution assembly according to claim 25, wherein the electrical connectors of the interface unit form electrical connections with different electrical signal consumer units selected from the group consisting of a telephone, a facsimile machine, a television, a computer and the like.

27. The signal distribution assembly according to claim 25, wherein the fibre termination unit incorporates a television receiver and connection means for connecting the receiver to a television display unit.

28. The signal distribution assembly according to claim 25, wherein the fibre termination unit has a service/customer demarcation cover with an aperture providing access to connection means for connecting a television signal and power cables thereto.

29. The signal distribution assembly according to claim 25, including a connector holder suitable for use in a communications signal distribution system, comprising a first part and a second part between which at least one of the optical connector elements of the fibre termination unit and the interface unit is secured, and the connector elements of at least one of the fibre termination unit and the interface unit have means for locating the connector holder in one of a plurality of positions and/or orientations on the base of the optical fibre termination unit, and means for holding the first and second parts together with the optical connector element of at least one of the fibre termination unit and the interface unit positioned between the first and second parts.

30. The signal distribution assembly according to claim 29, wherein the connector holder is orientable into different orientations to hold different connector elements in a predetermined position and/or orientation for cooperation with the complementary connector element.

31. The signal distribution assembly according to claim 30, in which the connector element to be held in the connector holder is chosen from MT-RJ, SC, SC duplex, LC, MU and Lcµ types.

32. The signal distribution assembly according to claim 29, in which the connector holder has means for retaining one of two or more different connector elements selected from a group comprising two or more different connectors.

* * * * *